United States Patent [19]

Hughes

[11] 3,821,721

[45] June 28, 1974

[54] IMAGE DISPLAY APPARATUS

[75] Inventor: Gordon Hughes, Macclesfield, England

[73] Assignee: International Computers Limited, London, England

[22] Filed: Mar. 15, 1973

[21] Appl. No.: 341,652

[30] Foreign Application Priority Data

Mar. 15, 1972 Great Britain .................... 11925/72

[52] U.S. Cl. 340/173 PL, 315/169 TV, 340/324 A, 340/166 EL

[51] Int. Cl.. G11c 11/28, G11c 11/32, H05b 37/00

[58] Field of Search .................. 340/173 PC, 324 A; 315/169 TV

[56] References Cited

UNITED STATES PATENTS

| | | | |
|---|---|---|---|
| 3,573,542 | 4/1971 | Mayer | 340/173 PC |
| 3,662,352 | 5/1972 | Schott | 340/173 PC |

*Primary Examiner*—Terrell W. Fears
*Attorney, Agent, or Firm*—Misegades, Douglas & Levy

[57] ABSTRACT

Apparatus for displaying an image on an arrangement of gas discharge cells is disclosed in which a matrix of image display cells is formed by the interlacing of a number of elementary cell matrices. The elementary cells are so arranged that corresponding single cells from all the elementary matrices fall within each image display cell. The brightness of each image cell is therefore dependent upon the number of its elementary cells which are energised and the brightness level of those energised elementary cells. By arranging that the individual elementary cells of an image cell have different brightness levels and selecting appropriate combinations of these elementary cells to be energised a brightness range of at least 12:1 is possible for a single image cell, thus allowing the arrangement to display half-tone images acceptably. Tone separation of a displayed image is possible by reducing the brightness range of the display cells. The variation in brightness of the elementary cells may be achieved by, for example, the incorporation of optical filters, such as neutral density filters, to absorb light from some of the elementary cells within an image cell or by regulating the current permitted to flow in each elementary cell. The decoding of coded brightness information to control the energisation of the elementary cells during scanning of those cells within a display cell is disclosed.

6 Claims, 1 Drawing Figure

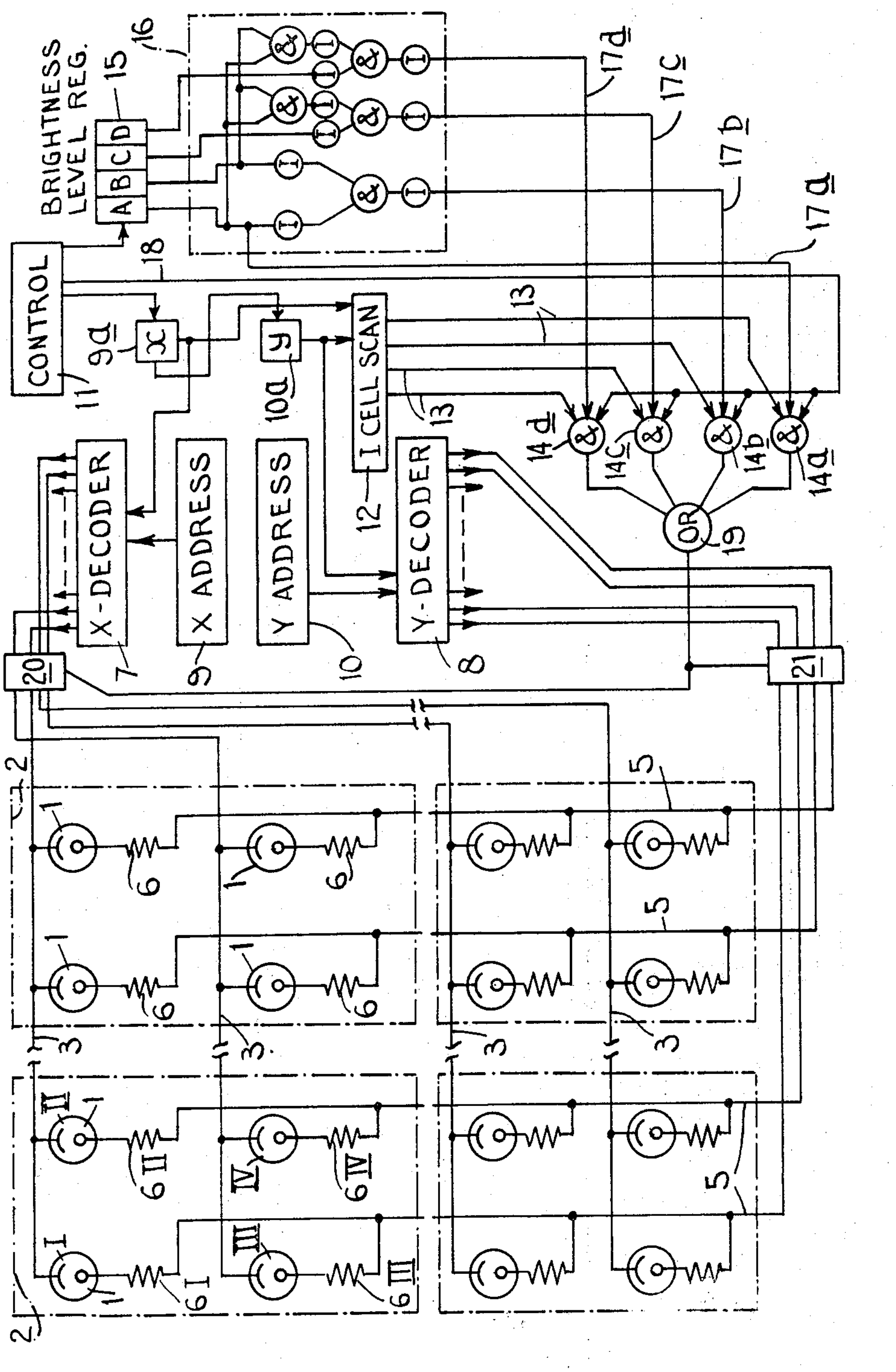
BRIGHTNESS LEVEL REG.
A B C D
CONTROL
X-DECODER
X ADDRESS
Y ADDRESS
I CELL SCAN
Y-DECODER
OR

IMAGE DISPLAY APPARATUS

BACKGROUND OF THE INVENTION

1. Field of the Invention

The present invention relates to a method of and apparatus for displaying images formed by a matrix of cells selectively illuminable to predetermined levels of brightness and in particular to such apparatus for displaying half-tone images having a plurality of grey levels.

2. Description of the Prior Art

It has previously been proposed to display images by the selective energisation of individual cells arranged in matrix formation. A matrix of cells suitable for use in this way may consist, for example, of an array of gas discharge cells, such an array commonly being referred to as a gas display matrix. A gas display matrix for storage and display purposes is described in greater detail in co-pending U.S. Pat. Application No. 289,709, filed Sept. 15, 1972, and such a matrix consists of a plurality of individual elementary cells, each consisting of a neon- or other gas-filled tube, the tubes being selectively energisable to produce a glow discharge. The elementary cells described in the application referred to are each capable of assuming one of two states: either glowing or extinguished. Thus, such a matrix is capable of displaying an image of only a single intensity of brightness, such as a line image. Because this image can consist only of cells which are either illuminated or dark this image will be referred to as a black-and-white image for convenience, although the actual colour of the image will, of course, depend upon the gas contained in the tubes. It will be appreciated that in order to display a half-tone image it is required that gradations in the brightness of the tubes that go to make up the matrix cells of the image are required, in order to simulate the required variations in the grey scale of the image.

SUMMARY OF THE INVENTION

According to the present invention apparatus for displaying an image by a plurality of illuminable image cells arranged in rows and columns includes a plurality of similar elementary cell matrices, the cell matrices each containing gas display cells arranged respectively in rows and columns corresponding to the rows and columns of the image cells, the elementary cells being selectively individually energisable to produce a glow discharge, the different elementary cell matrices being physically interlaced to displace corresponding ones of the elementary cells in different matrices one from another to locate within each image cell a corresponding single elementary cell from each different cell matrix respectively and means for selectively controlling the energisation of the elementary cells of each image cell selectively to vary the illumination brightness of the image cells.

BRIEF DESCRIPTION OF THE DRAWING

Apparatus embodying the present invention will now be described, by way of example, with reference to the accompanying drawing, which shows, diagrammatically, an image display arrangement.

DESCRIPTION OF THE PREFERRED EMBODIMENT

Referring now to the drawing, a number of gas-discharge tubes 1 are arranged in rows and columns. Each tube may be considered as an elementary cell 1 which may be illuminated by the selective application of an energising current in a manner to be described in detail hereafter. As indicated by broken lines image cells 2 are formed respectively each by groups of four adjacent elementary cells 1 arranged in a square configuration, so that the arrangement may also be considered as an array of rows and columns of image cells 2, the image cells 2 each containing a similar arrangement of four elementary cells 1.

It is to be understood that although the rows of the matrix as shown for the sake of clarity in the drawing contain only four elementary cells, a considerably greater number would in practice be provided, subject to the limitation that, in order to form complete image cells, the number of elementary cells in a row must be even. In the same way, a much larger number of elementary cells would be provided in a column, again subject to a similar limitation that the number would be even. Thus, the arrangement shown forms four image cells 2 in a matrix array of two-by-two, and in practice a greater number would be provided.

It is convenient, for the purposes of the present description, to identify separately the elementary cells 1 contained within an image cell 2. Thus, as indicated on the drawing, the elementary cells 1 of the upper-left-hand image cell 2 contains elementary cells referenced I to IV respectively and it is to be understood that all the image cells 2 will contain correspondingly notionally referenced elementary cells 1. Thus, the array of image cells 2 may be regarded as being formed from four interlaced matrices of elementary cells 1. One such matrix (I) would contain all those elementary cells referenced I, and would include the upper left-hand cell 1 (as shown on the drawing) of each of the image cells 2. The remaining three matrices would, in similar fashion, include all the cells 1 referenced II, III and IV respectively.

It is customary to control gas display cells by arranging that a cell is connected normally between voltage supply lines such that this voltage across the cell is midway between that required to initiate a glow discharge in the cell and the critical voltage level at which a glow discharge, once initiated, is extinguished. This normal voltage is frequently referred to as the "maintaining voltage." A cell is then "struck," or caused to glow, by the momentary application of a voltage greater than the striking or firing voltage, and, conversely, a glowing cell is extinguished by the momentary reduction of the voltage across the cell to a value less than that required to sustain the glow discharge. This system for controlling the striking and extinguishing of a cell is more fully described in the U.S. Pat. Application referred to above.

Referring once more to the drawing, the anodes of all the elementary cells 1 of a row are connected in common to form row lines 3, one for each of the elementary cell rows of the matrix respectively. Column connections or lines 5 are also provided one for each elementary cell column of the matrix respectively. Each line 5 is connected to cathode resistors 6 of all the elementary cells 1 of a column.

The row lines 3 and the column lines 5 are connected through selection networks 20 and 21, respectively, to decoding networks 7 and 8 for the X- and Y-axes of the matrix. The networks 7 and 8 are arranged to select one row line 3 and one column line 5 in order to select a single elementary cell 2 and the selection networks 20 and 21 provide pulses to drive the selected cells. The decoding networks 7 and 8 are respectively connected to X— address and Y— address registers 9 and 10. The address registers 9 and 10 each consist of a number of stages in which a binary coded address may be registered. The X- address register 9 consists of a main group of stages for containing the more significant binary denominations of the coded address and a further separate single stage 9*a* arranged to contain the least significant binary denomination.

The Y- address register 10 is somewhat similar and has a main group of stages for the more significant binary denominations and a separate single stage 10*a* for the least significant denomination. The two single stages 9*a* and 10*a* are also connected in tandem to provide a four-state counter and are provided with a counting input to the stage 10*a* from a control arrangement 11. As well as being applied as parts of the required X- and Y- addresses to the decoding networks 7 and 8, indications of the states of the stages 9*a* and 10*a* are also applied to a decoder 12 to present outputs successively, one on each of four lines 13. These outputs are applied respectively to condition a corresponding one of four AND gates 14, the gates being conditioned in turn in cyclic sequence.

The control arrangement 11 also provides an input to a brightness level register 15 having four stages A-D. This input sets these stages to indicate the required illumination from each image cell 2 by specifying the degree of illumination required from each of the constituent elementary cells 1.

The output from the stages of the brightness level register 15 are applied to a logic network 16 and lines 17 carry the resultant signals to the AND gates 14. A strobe pulse line 18 from the control arrangement 11 is connected to all the AND gates 14 to enable these gates to be sampled.

Outputs from the AND gates 14 are connected in common to an OR gate 19 and a resultant strobe output from the OR gate 19 is connected to strobe inputs of the selection networks 20 and 21.

Before consideration of the operation of the arrangement it will be helpful to review briefly the purpose of the image cell groups of elementary cells 1.

Each image cell 2 will have a visual brightness which is determined by the number of its constituent elementary cells 1 which are energised to glow. Thus if only one elementary cell of the group is glowing the brightness of the image cell will be of the order of one quarter of the brightness obtained if all four of the elementary cells are glowing. Thus the visual brightness range of an image cell having four constituent elementary cells will be about 4:1. While a range of this order is useful for the display, for example, of tone-separation images, which have a restricted grey-tone scale, it is found that a range of 4:1 is not sufficiently great for displaying in an acceptable manner a conventional half-tone image. On the other hand it is also found that a brightness range of about 12:1 produces an acceptable visual image.

The control of current flowing through an elementary cell, such as a cell 1, will also produce a variation in brightness of the cell. It is found, however, that the control of current in this way again produces effectively a brightness range of about 4:1, the range being limited on the one hand by the extinguishing current of the cell and on the other by the maximum current which the cell can pass. Moreover the variation of current flowing in a single cell requires that the cell driving and selection circuitry shall include means for switching the cell drive arrangements while the cell selection is effective whatever the setting of the drive switch. Thus, by using an arrangement in which a combination of elementary cells is used, with each cell having only a single predetermined brightness, the brightness range of an image cell may be increased at least to the desirable 12:1 range in the following way. Of the four cells 1 in each image cell 2, two (III and IV) are provided with cathode resistors 6 which will permit maximum current to flow to produce the maximum brightness of these cells. A third cell (II) has a cathode resistor 6 whose value will permit the cell to glow at half the maximum brightness and the fourth cell (I) has a cathode resistor 6 of such a value that it glows at one quarter the maximum brightness.

In operation the control arrangement 11 goes through a cycle of operation for the selection of each image cell 2 and on each cycle sequential scanning of the individual elementary cells 1 of the image cell 2 takes place. By way of illustration, let it be assumed that the operating cycle to be described begins at a point where a new address has just been entered into the address registers 9 and 10 in response to a control operation initiated by the control arrangement 11.

It is arranged that the entered addresses in the X- and Y- address registers respectively both terminate in zero so that at this point the more significant denominations of the addresses, as contained in the main X- and Y- address registers 9 and 10, will be capable of identifying one of a pair of adjacent rows of columns, as the case may be, the final selection of the required one of this pair being performed by the decoding of the contents of the single $x$ and $y$ stages 9*a* and 10*a*. Because these two stages both contain zero, then the decoded selection is arranged to identify respectively the uppermost row of the pair and the left-hand column of the pair.

Consideration of the arrangement of the upper left hand image cell 2 shown in the drawing will show that the first elementary cell 1 of this image cell to be selected is that additionally referenced I in the drawing. It will be appreciated that if four counting pulses are applied to the two stages 9*a* and 10*a*, these stages will cycle through a four-state count, from 00, to 01, 10 and finally 11. Applying decoding to this progressive count it will be realised that the four elementary cells 1 forming a single image cell 2 will be selected in turn in the order I; II; III; IV.

At the time when the addresses are entered into the registers 9 and 10 a brightness level code for the image cell 2 to be selected is entered into the brightness level register 15 as a four bit binary expression consisting of bits A-D. The expression is decoded by the logic network 16 and, according to the values of these bits a combination of output lines 17 will carry signals representative of the image cell brightness level required.

The lines 17 respectively condition corresponding ones of the AND gates 14. Each gate 14 is associated with one of the elementary cells 1 contained within the image cell 2 to be selected and it will now be apparent that the particular ones of the AND gates 14 to be conditioned by the outputs on the lines 17 will ultimately decide which of these elementary cells 1 are to be made to glow. The gates 14 are interrogated in order as the count in the stages 9*a* and 10*a* is progressively changed by the action of the scan decoder 12 in decoding the count registered by the stages 9*a* and 10*a* and applying a conditioning signal to that AND gate 14 corresponding to the particular one of the elementary cells 1 I to 1 IV which is represented by the count.

The control arrangement 11 provides the count pulses applied to the stages 9*a* and 10*a* and also provides, in synchronism with these count pulses, a strobe signal over line 18 to sample each of the gates 14 in turn. Thus the OR gate 19 provides a strobe output pulse for each one of the elementary cells 1 of the selected image cell 2 which is required to glow at the time when that cell 1 is selected by the address decoders 7 and 8.

The strobe pulses from the OR gate 19 are applied to the selection networks 20 and 21. The conditions for switching the cells of a matrix are set out in greater detail in the patent application referred to earlier. In the present case the anodes and cathodes of the elementary cells 1 are normally connected respectively to positive and negative rails of a maintaining voltage source in the manner described in the above-mentioned patent application. The selection networks 20 and 21 correspond to similar networks described in detail in the patent application referred to and are conditioned to apply a selection pulse, derived from the strobe pulse from the OR gate 19 in the present application, to cause a selected cell 1 to glow. The effect of the selection pulse is to modify, temporarily, the voltage across the selected cell 1 by a voltage increment which may, for present purposes, be regarded as having a magnitude of one half the difference between the maintaining voltage and the striking voltage for the cell. In the present case the polarity and application of the selection pulses is arranged so that a positive voltage increment is applied to those row lines 3 which are selected by the decoding of the X- address and a negative voltage increment is applied to that column line 5 which is selected by the decoding of the Y- address. Hence, during each selection of an elementary cell 1 only the selected cell may have its voltage increased by two increments to reach the striking voltage; and only if a strobe pulse is passed by the OR gate 19 at the time when this cell 1 is selected will the requisite voltage change occur. Hence, within a selected image cell 2, only those elementary cells 1 which are specified by the logic network 16 as required for the desired brightness level will be caused to glow. It will also be seen that in the application of the selection voltage increments to the rows and columns the following conditions obtain; for those cells 1 which lie at the intersections of unselected rows and columns there can be no effective voltage change; for those cells 1 in a selected row but an unselected column there can be only a single voltage increment change and for those cells 1 in a selected column but an unselected row again there is again only a single voltage increment change.

It will be recalled that the logic network 16 produces, from the contents of the brightness level register 15, outputs on lines 17 to determine which of the elementary cells 1 of an image cell 2 are required to glow to produce the required brightness level for the image cell 2. It will be seen that the following table sets out in convenient form a translation from a binary coded brightness level indication in the register 15 to a cell 1 selection to provide an effective brightness range of 12:1, where the elementary cell I of any image cell 2 is constrained always to produce a brightness level of one quarter of maximum intensity, the cell II always to produce a level of one half the maximum and the cells III and IV each always to produce maximum brightness.

| Brightness level register bits | Gates 14 conditioned | Elementary cells selected | Brightness level of image cell |
|---|---|---|---|
| A B C D | | | |
| 0 0 0 0 | none | none | 0 |
| 0 0 0 1 | *d* only | I only | ¼ |
| 0 0 1 0 | *c* only | II only | ½ |
| 0 0 1 1 | *c* and *d* | I and II | ¾ |
| 0 1 0 0 | *b* only | III only | 1 |
| 0 1 0 1 | *b* and *d* | I and III | 1¼ |
| 0 1 1 0 | *b* and *c* | II and III | 1½ |
| 0 1 1 1 | *b*, *c* and *d* | I, II and III | 1¾ |
| 1 0 0 0 | *a* and *b* | III and IV | 2 |
| 1 0 0 1 | *a*, *b* and *d* | I, III and IV | 2¼ |
| 1 0 1 0 | *a*, *b* and *c* | II and IV | 2½ |
| 1 0 1 1 | *a*, *b*, *c* and *d* | I, II, III and IV | 2¾ |

It will be realised that the brightness range of 12:1 is provided by the particular arrangement shown but that, for example, the effective brightness range can be changed by altering the logic network 16 and altering either the brightness steps of the individual elementary cells 1, or by altering the number of elementary cells 1 in an image cell 2.

The addressing system shown uses the X- and Y- address registers to specify a particular image cell 2, and the additional address stages 9*a* and 10*a* then specify the individual elementary cells 1 making up the selected image cell 2. Thus, for any image cell 2, the addressing system may be regarded as primarily selecting corresponding elementary cells 1 in each of the interlaced elementary cell matrices I to IV, the cells 1 of the elementary matrices then being further selected by the additional address stages 9*a* and 10*a*, so that these two stages may be regarded as elementary cell matrix selectors.

It will also be understood that alternative addressing arrangements may be employed for independently selecting the elementary cells 1 of any image cell 2, for example by the input of complete elementary cell addresses into the address registers 9 and 10 so that these registers will now also include the stages 9*a* and 10*a*. In this case the functions of the brightness level register 15 and the decoder 12 may be combined so that the selection of the individual elementary cells 1 then takes place without the need for a counting arrangement associated with the address registers.

It is also to be understood that other methods of selecting an image cell by addressing may be used. For example, other methods of cell addressing in a matrix are described in the co-pending patent application referred to herein. It will also be apparent that an extension of the counting arrangement applied to the stages 9*a* and 10*a* may be used to provided a complete sequential scan of the image cells 2 of the matrix. Thus, for example, if the main registers 9 and 10 are also made up of counting stages, a carry over from the stage 10*a* may be connected to increment the main register 9 and a carry over from this register may similarly be made to increment the main register 10. In this way, after each cycle of four counts from the stages 9*a* and 10*a* the address in the main register 10 will be changed and, thereafter, effectively the entire array of image cells 2 will be scanned in sequence by a continuous application of counting pulses from the control arrangement 11.

The foregoing description requires, to increase the brightness range of the display, that the elementary cells 1 making up an image cell 2 shall each be capable of glowing with a particular predetermined brightness and that this brightness shall be different in the case of at least two of the cells. This difference in brightness is obtained, as described, by the provision of circuit elements, i.e., the cathode resistors 6, in the individual elementary cell circuits. It will be clear, however, that the brightness difference may be obtained in other ways. For example, different types of elementary cells 1, having different inherent visual brightness characteristics may be used, or all the cells 1 could be electrically controlled to present the same inherent brightness and optical filters, such as neutral density filters, could be introduced to produce visually different levels of brightness for the individual elementary cells. This latter method of varying the individual cell brightness is of particular value where the display device uses a planar multi-cellular gas display panel in which individual elementary cells are formed by cavities in a plate and where, from considerations of physical size it is desirable to make the cell drive circuits as simple as possible. In such a case the filters could take the form of a single photographic plate carrying a complete filter pattern in which the required gradations of density occupy positions aligned with the respective cell cavities.

I claim:

1. Apparatus for displaying an image by a plurality of illuminable image cells arranged in rows and columns including a plurality of similar elementary cell matrices, the cell matrices each containing gas display cells arranged respectively in rows and columns corresponding to the rows and columns of the image cells, the elementary cells being selectively individually energizable to produce a glow discharge, the different elementary cell matrices being physically interlaced to displace corresponding ones of the elementary cells in different matrices one from another to locate within each image cell a corresponding single elementary cell from each different cell matrix respectively and means for selectively controlling the energization of the elementary cells of each image cell selectively to vary the illumination brightness of the image cells.

2. Apparatus as claimed in claim 1 in which the means for controlling the energization of the elementary cells includes means for registering image display information expressed as a brightness code specifying a level of brightness for each image cell and means for decoding the brightness code to select to be energised different combinations of the elementary cells of an image cell in dependence upon the different brightness levels expressible by said brightness code.

3. Apparatus as claimed in claim 2 in which the energization control means further includes means for selecting an image cell by selecting corresponding cells in each of the elementary cell matrices, means for sequentially scanning the selected elementary cells and means associated with said decoding means for strobing the decoded brightness code in synchronism with the scanning of the cells to permit the energization of only those elementary cells required to produce an image coil illumination of the specified brightness.

4. Apparatus as claimed in claim 3 in which all the cells of a single matrix are responsive to energization to produce illumination of substantially similar brightness and in which the cells of at least some matrices produce illumination of different brightness than those of other matrices.

5. Apparatus as claimed in claim 4 in which the means for controlling the energization of the elementary cells includes means for limiting current flowing in the cells, the current limiting means being arranged to permit different currents to flow in the cells of different matrices respectively.

6. Apparatus as claimed in claim 4 in which selected elementary cell matrices include means for optically reducing the visual brightness of energized cells.

* * * * *